United States Patent
Tamaki

(10) Patent No.: US 11,239,700 B2
(45) Date of Patent: Feb. 1, 2022

(54) WIRELESS POWER TRANSFER SYSTEM, POWER RECEPTION APPARATUS, AND CONTROL METHOD THEREFOR

(71) Applicant: CANON KABUSHIKI KAISHA, Tokyo (JP)

(72) Inventor: Hiroto Tamaki, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/846,165

(22) Filed: Apr. 10, 2020

(65) Prior Publication Data

US 2020/0336012 A1    Oct. 22, 2020

(30) Foreign Application Priority Data

Apr. 18, 2019    (JP) .............. JP2019-079565

(51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H02J 50/80 | (2016.01) |
| H01F 38/14 | (2006.01) |

(52) U.S. Cl.
CPC .............. H02J 50/12 (2016.02); H01F 38/14 (2013.01); H02J 50/80 (2016.02)

(58) Field of Classification Search
CPC . H02J 5/005; H02J 7/025; H02J 17/00; H01F 38/14; B60L 11/182
USPC ....................................................... 307/104
See application file for complete search history.

(56) References Cited

U.S. PATENT DOCUMENTS

| 5,499,005 A | * | 3/1996 | Gu ..................... H01P 3/088 333/161 |
| 10,332,672 B2 | * | 6/2019 | Jang .................... H02J 50/10 |
| 2012/0187903 A1 | * | 7/2012 | Tabata ................ H02J 50/70 320/108 |
| 2014/0184151 A1 | * | 7/2014 | Han ................. H01F 27/2804 320/108 |
| 2015/0097521 A1 | * | 4/2015 | Endou ............. H01F 27/2804 320/108 |
| 2018/0090974 A1 | * | 3/2018 | Elkayam ............. H02J 50/10 |

(Continued)

FOREIGN PATENT DOCUMENTS

| JP | 3815079 B2 | 8/2006 |
| JP | 2014-096612 A | 5/2014 |

*Primary Examiner* — Quan Tra
(74) *Attorney, Agent, or Firm* — Canon U.S.A., Inc. I.P. Division

(57) ABSTRACT

A wireless power transfer system includes: (a) an annular first substrate, a first coil, a second coil, and an annular second substrate that are stacked such that central axes of those substantially coincide with each other; (b) a power transmission circuit, implemented on the first substrate, for applying a voltage to the first coil; and (c) a power reception circuit, implemented on the second substrate, for rectifying an electric current that is generated at the second coil through electromagnetic induction and/or magnetic resonance. The second substrate is a multilayer substrate that includes a first layer provided with a ground pattern and a second layer provided with a power supply pattern, and includes slit portions where the patterns are not present as viewed from a direction of the central axes.

20 Claims, 4 Drawing Sheets

(56) References Cited

U.S. PATENT DOCUMENTS

2019/0356165 A1\* 11/2019 Jacobson .............. H01F 27/324
2019/0363565 A1\* 11/2019 Graham ................. H01F 38/14

\* cited by examiner

WIRELESS POWER TRANSFER SYSTEM, POWER RECEPTION APPARATUS, AND CONTROL METHOD THEREFOR

BACKGROUND

Field

The present disclosure relates to a power transfer system that contactlessly supplies power to devices.

Description of the Related Art

A harness for transferring power, image data, control signals, and the like can be implemented in a turning portion of a device that has a turnable portion, such as a robot hand portion, a network camera, or the like. However, such configurations can face issues because wear occurs due to the turning, and there are functional restrictions such as infinite free turning in the same direction being impossible. In view of these limitations, in recent years, there has been an increasing demand to be able to wirelessly transfer power and data in the turning portion.

Japanese Patent Laid-Open No. 2014-96612 proposes a configuration of an antenna module provided with a communication antenna and a contactless power transfer coil, and discloses wireless transfer of power and data between two such antenna modules. In such a contactless power transfer system, electromagnetic induction energy from a power transmission coil arranged on the power transmission side is converted to electric energy by a power reception coil arranged on the power reception side, and a device circuit is driven by the electrical energy. Here, various circuits connected to the power transmission coil and the power reception coil are required on the power transmission side and the power reception side. In order to realize a decrease in the size of an apparatus, it is conceivable to implement these circuits on a multilayer substrate and arrange the circuits near the power transmission coil and the power reception coil. When switching current passes through the power transmission coil, a magnetic field is generated, and the power reception coil converts the magnetic field into electric energy. However, in a case where a multilayer substrate is arranged near the power transmission coil and the power reception coil, a magnetic field generated from the power transmission coil may be transmitted to an inner layer, of the multilayer substrate, in which a ground pattern is formed on the entire surface and an inner layer having a power supply pattern, and eddy currents may be generated. As a result, such a power transfer system has disadvantages in that the output of the power reception coil is significantly decreased.

In order to resolve such issues, Japanese Patent No. 3815079 proposes a contactless power transfer system provided with a multilayer substrate that has first and second component implementing layers, a ground layer having a tree branch-shaped pattern, and a power supply layer having a tree branch-shaped pattern. The configuration of such a multilayer substrate reduces the generation of eddy currents, and thus it is possible to suppress a decrease in the output of the power reception coil. Note that a substrate having two or more layers will be referred to as a multilayer substrate in this disclosure.

A case is considered where the contactless power transfer system disclosed in Japanese Patent No. 3815079 is used to wirelessly transfer power to a turning portion such as that described above. In this case, although it is conceivable that the multilayer substrate disclosed in this literature is formed into an annular shape (a hollow structure) for passage of a shaft or the like for transmitting rotational power through the central axis thereof, problems may arise in that such a configuration may reduce the effect of suppressing a decrease in the output.

SUMMARY

According to various embodiments of the present disclosure, there is provided a wireless power transfer system, which includes: (a) an annular first substrate, a first coil, a second coil, and an annular second substrate that are stacked such that central axes of the first substrate, the first coil, the second coil, and the second substrate substantially coincide with each other; (b) a power transmission circuit configured to apply a voltage to the first coil, where the power transmission circuit is implemented on the first substrate; and (c) a power reception circuit configured to rectify an electric current that is generated at the second coil through at least one of electromagnetic induction or magnetic resonance, where the power reception circuit is implemented on the second substrate. The second substrate is a multilayer substrate that includes a first layer provided with a ground pattern and a second layer provided with a power supply pattern, and the second substrate includes slit portions where the ground pattern and the power supply pattern are not present as viewed from a direction of the central axes.

Further features will become apparent from the following description of example embodiments with reference to the attached drawings.

DESCRIPTION OF THE EMBODIMENTS

Figure 1:
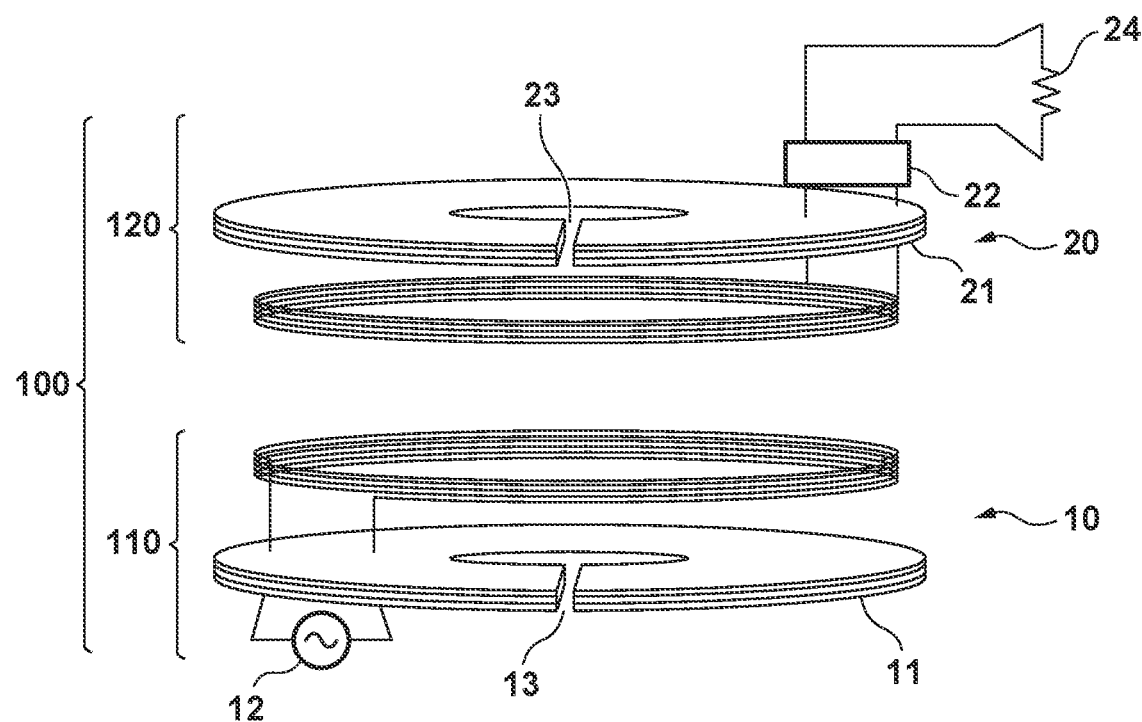
FIG. 1 shows a schematic configuration of a power transfer system according to a first embodiment.

Hereinafter, embodiments will be described in detail with reference to the attached drawings. Note that the following embodiments are not intended to limit the scope of the claimed invention. Multiple features are described in the embodiments, but limitation is not made such that an invention requires all such features, and multiple such features may be combined as appropriate. Furthermore, in the attached drawings, the same reference numerals are given to the same or similar configurations, and redundant description thereof is omitted.

First Embodiment

FIG. 1 shows a schematic configuration of a contactless power transfer system 100 (a power transfer system hereinafter) in a first embodiment. The power transfer system 100 is constituted by a portion for contactlessly (wirelessly) transferring power and a portion for wirelessly transferring image signals, control signals, and the like. The power transfer system 100 is constituted by a power transmission side 110 and a power reception side 120, and a power transmission circuit 12 and a power transmission coil 10 are arranged on the power transmission side 110, and a power reception coil 20, a power reception circuit 22, and a load 24 are arranged on the power reception side 120, and power is transferred from the power transmission side 110 to the power reception side 120.

Although portions for wirelessly transferring image signals, control signal, and the like are not shown in FIG. 1, a transmission circuit and a transmission coupler are formed on the power transmission side 110, and a reception coupler and a reception circuit are formed on the power reception side 120, and transfer lines for connecting transmission/reception circuits and couplers, and the like are formed on the respective sides, for example. Here, although the transmission circuit may be arranged (mounted) on the power transmission side 110 and the reception circuit may be arranged on the power reception side 120, the arrangement can be reversed thereto. Also, it is possible to arrange the transmission circuits and the reception circuits on both the power transmission side 110 and the power reception side 120 to perform half-duplex or full-duplex communication. In this manner, the configuration of transferring signals is not limited to a specific configuration. Also, there are no particular limitations on a transfer medium and a communication method for transferring signals, and electric fields, magnetic fields, electromagnetic field coupling, optical communication, and the like may be used. A method may be used in which a differential data signal is generated by a transmission circuit, power is supplied to a transmission coupler, the differential signal is received by a power reception coupler that is mainly electrically coupled to the transmission coupler, and the differential signal is converted to a digital signal by a comparator or the like, for example.

Also, an annular printed circuit board 11 for wiring and implementing electronic components such as the power transmission circuit 12 and the transmission circuit is provided on the power transmission side 110. Also, an annular printed circuit board 21 for wiring and implementing the power reception circuit 22, the reception circuit, and the like is provided on the power reception side 120. Because application of a rotation portion is considered, the arrangement of the transmission coupler and the power transmission coil 10 is desirably concentric, and the transmission coupler and the power transmission coil 10 may be arranged such that the transmission coupler is arranged outside and a power transmission antenna is arranged inside, or vice versa. As shown in FIG. 1, the printed circuit board 11, the printed circuit board 21, the power transmission coil 10, and the power reception coil 20 are arranged overlapping each other such that the central axis directions thereof substantially coincide with each other.

A configuration may be adopted in which the transmission coupler and the power transmission coil 10 are formed on the same substrate, or are respectively formed on separate substrates, or are formed by a wire such as a litz wire. The same applies to the arrangement and structures of the reception coupler and the power reception coil 20. A configuration may be adopted in which the transmission coupler and the power transmission coil 10 are formed as patterns in the printed circuit board 11, and the reception coupler and the power reception coil 20 are formed as patterns in the printed circuit board 21, for example. Also, a configuration may be adopted in which the transmission coupler is formed as a pattern in the substrate 11, the reception coupler is formed as a pattern in the substrate 21, and the power transmission coil 10 and the power reception coil 20 are formed separately from the substrate 11 and the substrate 21, for example. Also, the printed circuit board may be a general FR4 substrate, or a substrate constituted by a low dielectric member formed using ceramic, fluorine, or the like, and there is no limitation thereto.

The power transmission circuit 12 and the power transmission coil 10 are respectively constituted by known power transmission circuit and power transmission coil used when electromagnetic induction or magnetic resonance is adopted. A direct-current voltage supplied from an external power source (not shown) is converted with use of an inverter circuit to an AC voltage having a frequency suitable for transmission (transmission frequency hereinafter), and is output to the power transmission coil 10 via a switch unit. That is, a direct current is converted to an alternating current in the power transmission circuit 12, and an alternating-current magnetic field is generated by the power transmission coil 10 on the power transmission side 110. Similarly, the power reception circuit 22 and the power reception coil 20 are respectively constituted by known power reception circuit and power reception coil used when electromagnetic induction or magnetic resonance is adopted. Specifically, an alternating magnetic field received by the power reception coil 20 is converted to a direct current by a rectifier circuit, converted by a voltage conversion circuit to a voltage desired by the load 24 and the reception circuit, and direct-current power is supplied to the load and the reception circuit through a power supply pattern of the substrate. In this manner, power is wirelessly transferred from the power transmission side 110 to the power reception side 120 through at least any of electromagnetic induction and magnetic resonance.

Here, a case where the above-described power transfer system is applied to a turnable portion of an industrial robot or a network camera is considered. In this case, there are cases where the printed circuit board 11 for wiring and implementing the power transmission circuit 12, the transmission circuit, and the like, the transmission coupler, and the power transmission coil 10 are arranged close to each other due to an implementation space being limited. Also, the same applies to the power reception side 120. If a voltage is applied from the power transmission circuit 12 implemented on the printed circuit board 11 to the power transmission coil 10 to cause switching current to flow in a state in which the power transmission coil 10 and the power reception coil 20 are close to each other, an alternating magnetic field is generated passing through the central portion of the power transmission coil 10 toward the vicinity thereof. The alternating magnetic field is converted into electric energy as a result of the alternating magnetic field interlinking with the power reception coil 20, and the output current is rectified by the power reception circuit 22 in the printed circuit board 21, and power can be supplied to the load 24.

However, if the power transmission coil 10, the power reception coil 20, the printed circuit board 11, and the printed circuit board 21 are arranged close to each other, the alternating magnetic field also interlinks with the printed circuit board 21 arranged above the power reception coil 20 at the same time, and thus current is induced in a copper layer pattern in the printed circuit board 21. In particular, a conventional entire surface power supply pattern is interlinked with the alternating magnetic field generated by the power transmission coil 10 in a large area, and a large eddy current is generated in the entire surface power supply pattern, resulting in power loss, circuit noise, and malfunction.

In view of this, the printed circuit boards 11 and 21 of this embodiment is configured as follows, with use of a four-layer substrate as an example. That is, surface layers on a front side and a back side that include electric components such as ICs (Integrated Circuits) such as the power transmission circuit 12, the power reception circuit 22, the transmission circuit, and the reception circuit, and chip components, and wires therefor, a first inner layer having a ground (GND) pattern (an earth pattern) for providing a reference potential to the ICs and the like, and a second inner layer having a power supply pattern for supplying power to the ICs and the like are formed, and in a case where the printed circuit boards 11 and 21 are projected from the upper surfaces thereof (when viewed in a direction perpendicular to the surface thereof, that is, when viewed in the central axis directions of the annular substrates), slit portions where there are no copper layer patterns such as the ground pattern and the power supply pattern are provided (e.g., slit portions 13 and 23 shown in FIG. 1). Note that although both the printed circuit board 11 and the printed circuit board 21 have slit portions in this embodiment, the various embodiments are not limited thereto, and either one of the printed circuit board 11 and the printed circuit board 21 may have a slit portion.

The alternating magnetic field generated from the power transmission coil 10 passes through the power reception coil 20, and interlinks with the power supply pattern and the ground pattern provided with the slit portions. According to the arrangements of the printed circuit board 11 and 21 according to this embodiment, the power supply pattern and the ground pattern of the printed circuit boards 11 and 21 are changed from an annular shape into a C-shape by the slit portions, and thus the loop area where the alternating magnetic field interlinks can be reduced. In a case where the printed circuit board 11, the power transmission coil 10, the power reception coil 20, and the printed circuit board 22 are arranged close to and in parallel to each other, a loop area S is simply a value obtained by subtracting the area of an inner circle from the area of an outer shape of the printed circuit board 21. On the other hand, in a case where no slit portions are provided, the area of the outer shape of the printed circuit board 21 is the loop area. Thus, it is also possible to suppress eddy currents to be generated, in proportion to the loop area. Also, because eddy-current power loss is proportional to the square of the current, the eddy-current losses occurring in the power supply pattern and the ground pattern are significantly reduced. Although it is preferable to narrow the width of the power supply pattern as much as possible and widen the slit width in order to reduce eddy currents as much as possible, the area for enabling implementation of components and wiring will be reduced, and thus it is sufficient to provide a gap such that the impedance between one end and the other end of a slit portion is sufficiently high with respect to switching frequency of switching current, for example, about 0.4 mm to 2 mm for a substrate having a thickness of 1.6 mm Note that if the slit portion does not have a copper layer pattern, the effect of reducing eddy currents can be obtained. Thus, the shape of the printed circuit board may be a C-shape as shown in FIG. 1, or may be a disk shape or a ring shape having no cuts.

Figure 2:
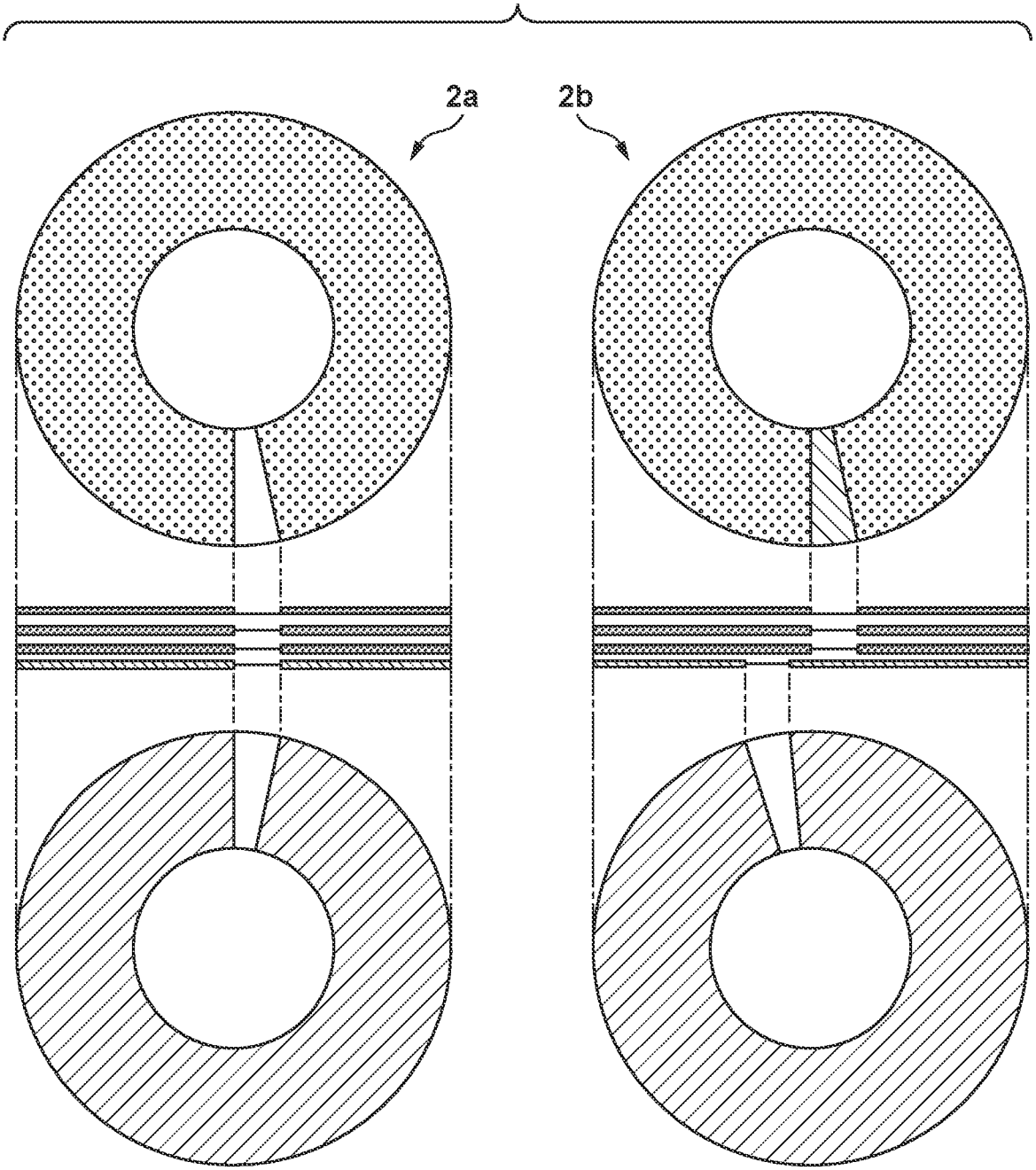
FIG. 2 shows the arrangements of a printed circuit board of the power transfer system according to the first embodiment.

FIG. 2 shows the arrangements (a top view, a cross-sectional side view, and a bottom view) of the printed circuit boards 11 and 21 of the power transfer system 100 in this embodiment. An arrangement 2a indicates the arrangement of a printed circuit board provided with slit portions at the same position of four layers (such that the slit portions overlap each other when projected from the upper surface of the printed circuit board (in a direction perpendicular to the plane of the printed circuit board). Also, an arrangement 2b is a variation of the arrangement 2a, and indicates the arrangement of the printed circuit board provided with slit portions at different positions between some layer and the other layers of the four layers (such that the slit portions do not overlap each other when projected from the upper surface of the printed circuit board). Specifically, when projected and viewed from the upper surface of the printed circuit board, only the slit portion provided in the fourth layer is shifted from the slit portions provided in the other layers (the fourth layer is shifted). With the slit portion having such an arrangement, the impedance of the slit portion provided in the fourth layer is smaller than that in the case where the layers have the same slit position, due to parasitic capacitance and the like with the power supply pattern or the ground pattern of the third layer. However, if the impedance between one end and the other end of the slit portion can be maintained to be high such that the generation of eddy currents is suppressed in the ground pattern and the power supply pattern, with respect to switching frequency, the effect of suppressing a decrease in the output of the power reception coil can be obtained. Also, the arrangement 2b is an example in which the fourth layer is shifted, but there is no particular limitation on the fourth layer, and the layers may have slit portions at different positions when projected from the upper surface of the substrate as long as the impedance is sufficiently high with respect to switching frequency.

Figure 3:
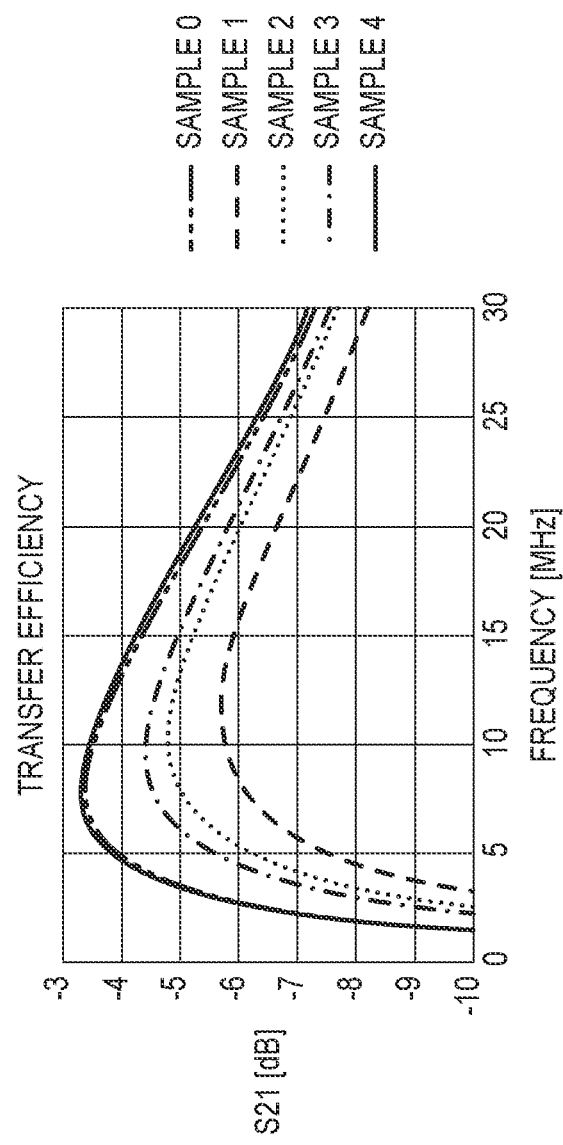
FIG. 3 shows the results of simulation of transfer efficiency for the power transfer system according to the first embodiment.
Figure 3:
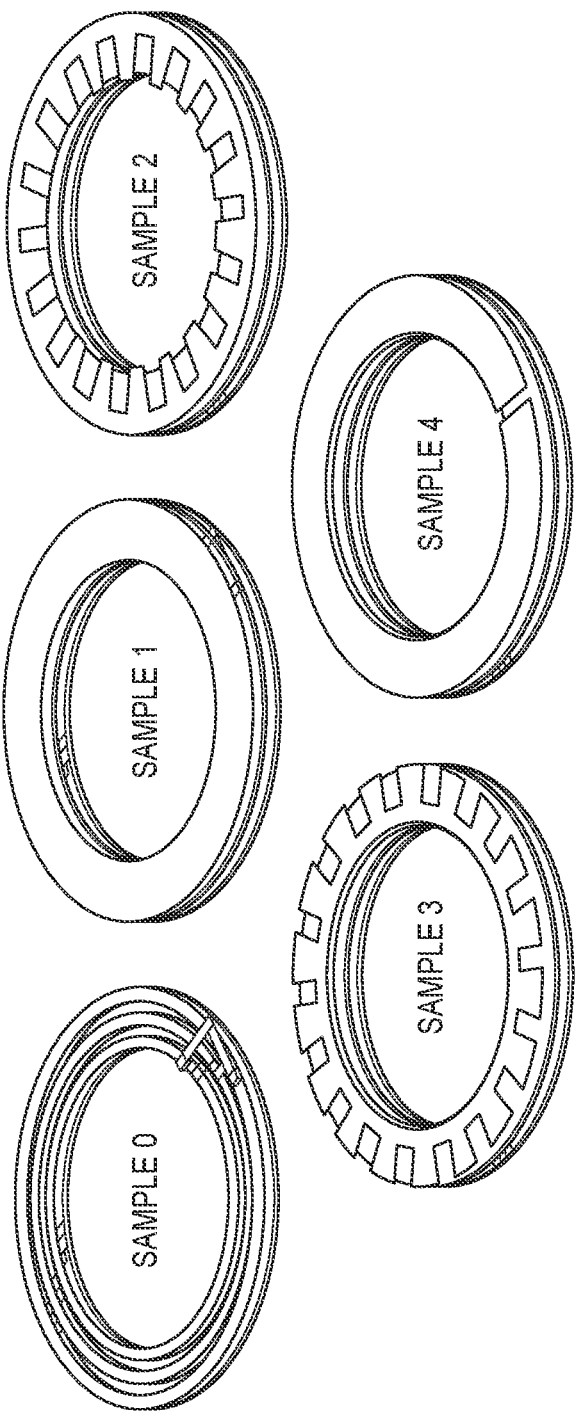

In order to illustrate the effect of the first embodiment, characteristics of power transfer efficiency were evaluated through three-dimensional electromagnetic field simulation. FIG. 3 shows the results of simulation of transfer efficiency for the power transfer system in this embodiment. In FIG. 3, the horizontal axis indicates frequency [MHz], and the vertical axis indicates S21 [dB], which indicates transmission properties between the power transmission coil and the power reception coil. The line-double dashed line indicates transfer characteristics obtained when only the power transmission and reception coils are arranged (referred to as Sample 0 hereinafter). The broken line indicates transfer characteristics obtained when a conductor with presumption of an entire surface ground pattern being arranged in the vicinity of the power transmission and reception coils (referred to as Sample 1 hereinafter). It is understood that the maximum transfer efficiency of Sample 1 deteriorates by about 2 dB with respect to that of Sample 0 due to the substrate having the entire surface ground pattern being arranged in the vicinity of the power reception coil. The dotted line and the chain line indicate the results obtained as a result of forming a ground pattern into the tree-branch shape disclosed in Japanese Patent No. 3815079 and conducting verifications (referred to as Samples 2 and 3 hereinafter). Although it is understood that Samples 2 and 3 had the effect of further suppressing a decrease in power generated in the power reception coil, compared to Sample 1, it is understood that Samples 2 and 3 had transfer efficiency that is lower than that of Sample 0. The solid line indicates transfer characteristics of this embodiment (referred to as Sample 4 hereinafter). Sample 4 was obtained by providing a 2-mm slit to the entire surface ground pattern of Sample 1. It was revealed that as a result of providing such a slit, transfer efficiency was almost the same as that when the power transmission and reception coils are present alone.

In this manner, according to this embodiment, even in a case where a substrate having a hollow substrate structure for passage of a shaft and the like, that is, an annular multilayer substrate, is used near the power transmission and reception coils, it is possible to suppress a decrease in the output of the power reception coil. Also, as a result of slit portions being configured not to overlap each other when projected from the upper surface of the printed circuit board, it is possible to easily and reliably conduct verifications at the time of checking design drawings.

Second Embodiment

Figure 4:
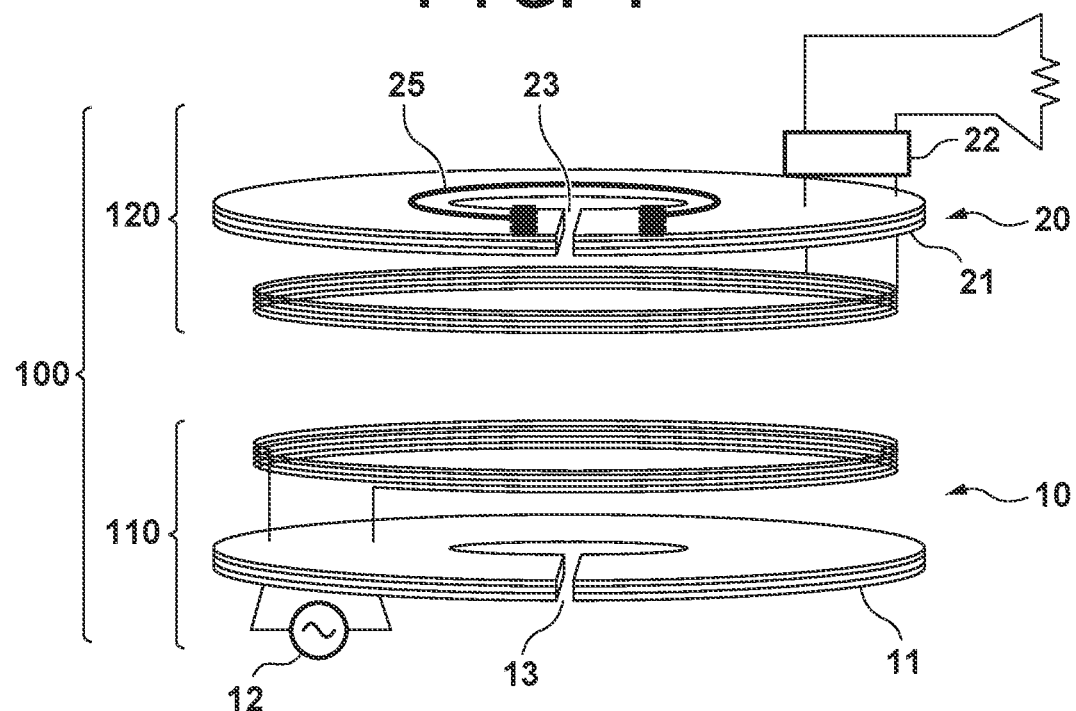
FIG. 4 shows a schematic configuration of a power transfer system according to a second embodiment.
Figure 5:
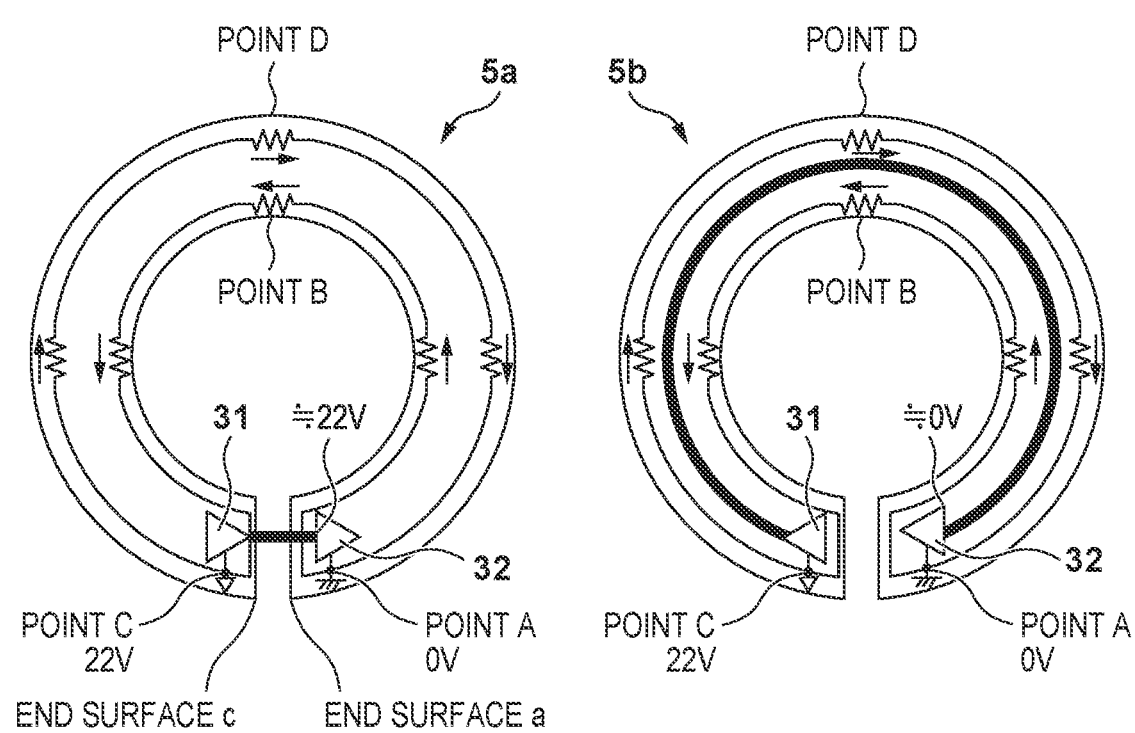
FIG. 5 shows diagrams illustrating the principle of the power transfer system according to the second embodiment.

FIG. 4 shows a schematic configuration of a power transfer system 400 according to a second embodiment. The power transfer system 400 differs from the power transfer system 100 of the first embodiment in that a signal line 25 for image signals and control signals is defined. FIG. 5 shows diagrams illustrating the principle of the power transfer system 400 in this embodiment. With an arrangement 5a and an arrangement 5b, a transmission circuit 31 is connected to one end of the signal line 25, and the reception circuit 32 is connected to the other end of the signal line 25. The arrangement 5a indicates an example in which the signal line 25 is arranged to span the slit portion, and the arrangement 5b indicates an example in which the signal line 25 is arranged not to span the slit portion. Similarly to the first embodiment, when a switching current flows from the power transmission circuit 12 implemented on the printed circuit board 11 to the power transmission coil 10, an alternating magnetic field is generated passing through the central portion of the power transmission coil 10 toward the vicinity thereof. The alternating magnetic field interlinks with the power reception coil 20 and is converted into electric energy, and thus it is possible to supply power.

However, if the power transmission coil 10, the power reception coil 20, the printed circuit board 11, and the printed circuit board 21 are arranged close to each other, the alternating magnetic field also interlinks with the printed circuit board 21 arranged above the power reception coil 20 and the printed circuit board 11 arranged below the power reception coil 20 at the same time, and thus current is induced in copper layer patterns in the printed circuit board 11 and the printed circuit board 21. The induced current is eddy current generated by the alternating magnetic field over the entire surface of conducting portions mounted on the printed circuit boards. Although this eddy current changes in accordance with a change in the alternating magnetic field, when the eddy current is grasped macroscopically, the eddy current flows to form a loop so as to start from a point A, passes through a point B located inside the substrate, passes through a point D via a point C located opposite thereto, and returns to the point A again.

Here, a potential difference occurring between a substrate end surface a located on the point A side and a substrate end surface c located on the point C side was calculated through a 3D-electromagnetic field simulator. As a result of simulations presuming that a switching noise of about 150 V was applied to the power transmission coil, a magnetic field with 10.9 kV/m was generated between the substrate end surfaces a and c. It was revealed through simulation that when a line integral of the magnetic field across the slit was obtained, since the slit width at the time of simulation was 2 mm at this time, a potential difference was approximately 22 V.

A difference of approximately 22 V arose between the point A and the point C, and in a case where the signal line 25 spans this slit portion from the transmission circuit 31 to the reception circuit 32, a signal with a signal voltage of ±22V will be applied to the reception circuit 32, as a result of which there is a risk that the applied voltage may exceed the withstand voltage of a general CMOS or TTL logic IC, resulting in breakage. In a case where the signal line 25 is directly wired from the point C to the point A to span the slit portion, issues such as malfunction and breakage of the IC arise. On the other hand, with the arrangement 5b, the signal line 25 is wired from the point C to the point A via the point D (the point B). The potential induced by the signal line 25 is substantially the same as the potential of the point A due to wiring in this manner, and thus it is possible to prevent malfunction and breakage of the IC. Note that in a case where the signal line 25 is arranged as in the arrangement 5b, a configuration may be adopted in which a capacitive element and a resistor are connected to the transmission circuit 31, and a capacitive element is connected to the reception circuit 32. With such an arrangement, the effect of further reducing a potential difference will be obtained.

According to the above-described embodiment, it is possible to suppress a decrease in the efficiency of wireless power transfer with use of an annular shaped multilayer substrate and coils.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2019-079565, filed Apr. 18, 2019, which is hereby incorporated by reference herein in its entirety.

What is claimed is:

1. A wireless power transfer system, comprising:
an annular first substrate, a first coil, a second coil, and an annular second substrate that are stacked such that central axes of the first substrate, the first coil, the second coil, and the second substrate substantially coincide with each other;
a power transmission circuit configured to apply a voltage to the first coil, wherein the power transmission circuit is implemented on the first substrate; and
a power reception circuit configured to rectify an electric current that is generated at the second coil through at least one of electromagnetic induction or magnetic resonance, wherein the power reception circuit is implemented on the second substrate,
wherein
the second substrate is a multilayer substrate that includes a first layer provided with a ground pattern and a second layer provided with a power supply pattern, and
the second substrate includes slit portions where the ground pattern and the power supply pattern are not present as viewed from a direction of the central axes.

2. The wireless power transfer system according to claim 1,
wherein the slit portions are configured such that the impedance between one end and another end of each slit portion is maintained at a high impedance such that generation of an eddy current is suppressed in the ground pattern and the power supply pattern, with respect to switching frequency of a switching electric current according to a voltage applied by the power transmission circuit.

3. The wireless power transfer system according to claim 1, wherein the slit portions are formed at substantially the same position in a plurality of layers that constitute the multilayer substrate.

4. The wireless power transfer system according to claim 1,
wherein the slit portions are formed at different positions in one or more layers as compared to other layers of a plurality of layers that constitute the multilayer substrate.

5. The wireless power transfer system according to claim 1,
wherein the slit portions each includes a gap of 0.4 mm to 2 mm.

6. The wireless power transfer system according to claim 1,
wherein the first coil is constituted as a pattern on the first substrate, and the second coil is constituted as a pattern on the second substrate.

7. The wireless power transfer system according to claim 1,
wherein the wireless power transfer system comprises a signal line for transferring a signal that is arranged on the second substrate so as not to span the slit portion.

8. The wireless power transfer system according to claim 7,
wherein a transmission circuit is connected to one end of the signal line and a reception circuit is connected to another end of the signal line, a capacitive element and a resistor are connected to the transmission circuit, and a capacitive element is connected to the reception circuit on the second substrate.

9. The wireless power transfer system according to claim 1,
wherein power that is based on an electric current rectified by the power reception circuit is supplied to a load via the power supply pattern.

10. The wireless power transfer system according to claim 1,
wherein the first substrate is a multilayer substrate that includes a third layer provided with another ground pattern and a fourth layer provided with another power supply pattern, and
the first substrate includes another slit portion where the ground pattern and the power supply pattern are not present as viewed from the direction of the central axes.

11. The wireless power transfer system according to claim 10,
wherein the other slit portion is configured such that the impedance between one end and another end of the other slit portion is maintained at a high impedance such that generation of an eddy current is suppressed in the other ground pattern and the other power supply pattern, with respect to switching frequency of a voltage applied by the power transmission circuit.

12. A power reception apparatus, comprising:
an annular substrate and a coil that are stacked such that central axes of the substrate and the coil substantially coincide with each other; and
a power reception circuit configured to rectify an electric current that is generated at the coil through at least one of electromagnetic induction or magnetic resonance, wherein the power reception circuit is implemented on the substrate,
wherein
the substrate is a multilayer substrate that includes a first layer provided with a ground pattern and a second layer provided with a power supply pattern, and
the substrate includes a slit portion where the ground pattern and the power supply pattern are not present as viewed from a direction of the central axes.

13. The power reception apparatus according to claim 12,
wherein the slit portion is configured such that the impedance between one end and another end of the slit portion is maintained at a high impedance such that generation of an eddy current is suppressed in the ground pattern and the power supply pattern.

14. The power reception apparatus according to claim 12,
wherein the power reception apparatus comprises a signal line for transferring a signal that is arranged on the substrate so as not to span the slit portion.

15. A method for controlling a wireless power transfer system that includes an annular first substrate, a first coil, a second coil, and an annular second substrate that are stacked such that central axes of the first substrate, the first coil, the second coil, and the second substrate substantially coincide with each other, the method comprising:
applying a voltage to the first coil from a power transmission circuit implemented on the first substrate; and
rectifying an electric current that is generated at the second coil through at least one of electromagnetic induction or magnetic resonance, by a power reception circuit implemented on the second substrate,
wherein
the second substrate is a multilayer substrate that includes a first layer provided with a ground pattern and a second layer provided with a power supply pattern, and
the second substrate includes a slit portion where the ground pattern and the power supply pattern are not present as viewed from a direction of the central axes.

16. The control method according to claim 12,
wherein the slit portion is configured such that the impedance between one end and another end of the slit portion is maintained at a high impedance such that generation of an eddy current is suppressed in the ground pattern and the power supply pattern, with respect to switching frequency of a voltage applied by a power transmission circuit.

17. The control method according to claim 12, comprising transferring a signal through a signal line arranged on the substrate so as not to span the slit portion.

18. A wireless power transfer system, comprising:
an annular first substrate, a first coil, a second coil, and an annular second substrate that are stacked such that central axes of the first substrate, the first coil, the second coil, and the second substrate substantially coincide with each other;
a power transmission circuit configured to apply a voltage to the first coil, wherein the power transmission circuit is implemented on the first substrate; and
a power reception circuit configured to rectify an electric current that is generated at the second coil through at least one of electromagnetic induction or magnetic resonance, wherein the power reception circuit is implemented on the second substrate,
wherein a pattern formed by a conductor on the second substrate is not a loop shape surrounding a center of the second substrate as viewed from a direction of the central axes, and
wherein the second substrate is a multilayer substrate that includes a first layer provided with a ground pattern providing a reference potential to the second substrate and a second layer provided with a power supply pattern.

19. The wireless power transfer system according to claim 18, wherein the first coil is constituted as a pattern on the first substrate, and the second coil is constituted as a pattern on the second substrate.

20. A method for controlling a wireless power transfer system that includes an annular first substrate, a first coil, a second coil, and an annular second substrate that are stacked such that central axes of the first substrate, the first coil, the second coil, and the second substrate substantially coincide with each other, the method comprising:
- applying a voltage to the first coil from a power transmission circuit implemented on the first substrate; and
- rectifying an electric current that is generated at the second coil through at least one of electromagnetic induction or magnetic resonance, by a power reception circuit implemented on the second substrate,
- wherein a pattern formed by a conductor on the second substrate is not a loop shape surrounding a center of the second substrate as viewed from a direction of the central axes, and
- wherein the second substrate is a multilayer substrate that includes a first layer provided with a ground pattern providing a reference potential to the second substrate and a second layer provided with a power supply pattern.

* * * * *